April 17, 1962 — E. X. SCHMIDT ET AL — 3,029,640
FLUID METER
Filed Sept. 14, 1959
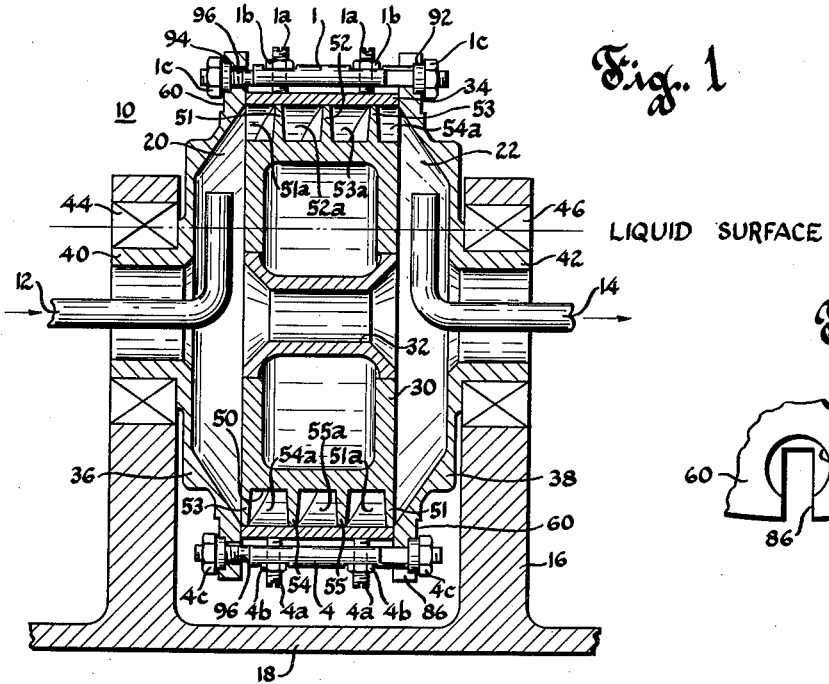
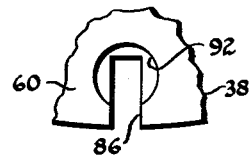
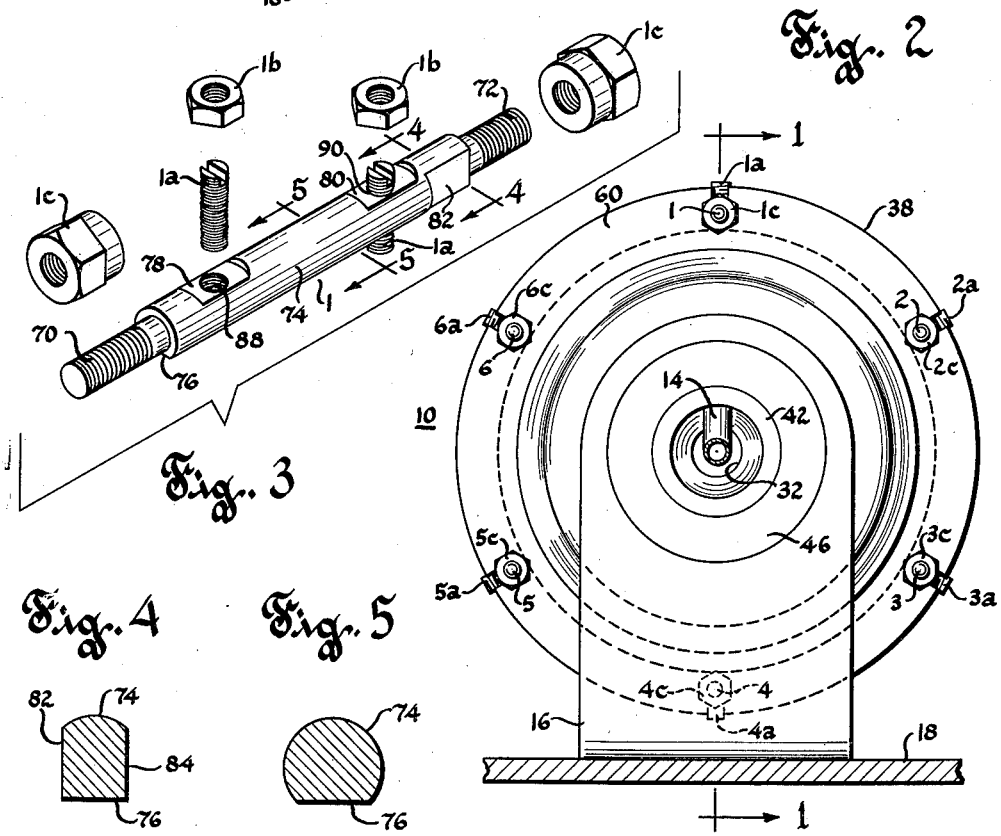

United States Patent Office 3,029,640
Patented Apr. 17, 1962

3,029,640
FLUID METER
Edwin X. Schmidt, Nashotah, and Palmer T. Severson, Wauwatosa, Wis., assignors to Cutler-Hammer, Inc., Milwaukee, Wis., a corporation of Delaware
Filed Sept. 14, 1959, Ser. No. 839,764
4 Claims. (Cl. 73—235)

This invention relates to improvements in fluid metering devices and more particularly to fluid meters employed in calorimetric apparatus wherein apparent variations in the total heating value per unit volume of the test gas due to pulsations in the volumetric rate of supply thereof are minimized or substantially eliminated.

In the manufacture of gas meter bodies it is practically impossible to manufacture gas meter bodies which are symmetrical in physical structure. As a result, when a gas meter body of the wet displacement type is rotated in a fluid about its major horizontal axis, variations in internal surfaces of the meter may and frequently will produce variations in its gas delivery characteristic which, with a uniform rate of rotation, will result in a variable rate of delivery of gas to the burner and result in an objectionable chart weave related to meter position. Although the variations in delivery do not necessarily follow a simple sine wave per gas meter revolution there is a definite tendency to do this. Therefore, an object is to provide a novel fluid meter for reducing the weave in recordings on relatively high B.t.u. range calorimeter charts due to pulsations in the volumetric rate of supply of the test gas.

A more specific object of the invention is to provide an improved fluid meter construction wherein the center of rotation of the meter body may be adjusted relative to abutting end bells to substantially correct undesirable cyclic variations in its delivery characteristics due to asymmetric formation of the meter body.

Another object is that of generally improving the structural and operative characteristics of such fluid meters.

Other objects and advantages of the invention will hereinafter appear.

The accompanying drawings illustrate a preferred embodiment of the invention which will be hereinafter described in detail, it being understood that the embodiment illustrated is susceptible of various modifications without departing from the scope of the appended claims.

In the drawings:

FIGURE 1 is a sectional view taken substantially along lines 1—1 of FIG. 2 illustrating schematically a fluid meter constructed in accordance with our invention;

FIG. 2 is a side elevational view;

FIG. 3 is an exploded isometric view of a part shown in FIG. 1;

FIG. 4 is a sectional view taken along lines 4—4 of FIG. 3;

FIG. 5 is a sectional view taken along lines 5—5 of FIG. 3; and,

FIG. 6 is an enlarged fragmentary view illustrating details of a slotted and recessed opening in a part shown in FIGS. 1 and 2.

In the drawings, FIGS. 1 and 2 illustrate a fluid meter, designated generally by reference numeral 10, having a fluid inlet tube 12 and a fluid outlet tube 14. Meter 10 is horizontally mounted on a stationary frame 16 within a liquid containing tank 18 for rotation about its major axis and has an inlet chamber 20 and an outlet chamber 22 which are in open communication with the inlet tube 12 and outlet tube 14, respectively, and with the liquid within the tank 18. The meter body 30 is provided with an enlarged centrally located opening 32 which communicates between the inlet and outlet chambers below the liquid surface.

More particularly, the meter 10 comprises a substantially cylindrical body 30 co-axially positioned within a cylindrical hood 34. The hood 34 is engaged on opposite sides by a pair of substantially symmetrical end plates 36 and 38 and is compressively retained therebetween by radially spaced clamping bolts 1 through 6. End plates 36 and 38 are provided respectively with centrally located hollow journals 40 and 42 which are rotatably mounted within alined bearings 44 and 46 carried in a well known manner in the upwardly extending arms of frame 16.

The outer peripheral wall 50 of body 30 is provided with five integrally formed, helicoidal fins 51 to 55 of equal length and pitch, as shown in FIG. 1. The fins adjacent to one another cooperate with hood 34 to define fluid-tight, helicoidal passages 51a through 55a about the outer circumferential surface of body 30. Accordingly, assuming the meter 10 to be provided with a suitable water or other liquid seal and to be supplied with gas entering chamber 20 through inlet tube 12, uniform rotation of the meter in any well known manner will cause the gas to be trapped and conveyed through the aforesaid passages to the outlet chamber 22 thus providing a continuous supply of gas to be delivered to outlet tube 14.

If it were possible to provide a meter of perfectly symmetrical construction, the delivery of gas to the outlet tube 14 would be not only continuous but also uniform. However, such accuracy in casting and machining of the component parts of such a meter is substantially impossible if costs of manufacture are kept within acceptable limits. Accordingly, an essential feature of this invention is the provision of means for adjusting the center of rotation of the meter body 30 relative to that of the end plates 36 and 38, thereby substantially reducing undesirable variations in the delivery characteristic of the meter due to asymmetric formation of certain component parts thereof.

The aforementioned bolts 1 to 6 for clamping the end plates 36 and 28 to the meter body 30 are spaced at 60 degree intervals on a bolt circle 60 formed on the surface of the end plates concentric with the axis of rotation of the latter, and are provided with adjusting screws 1a, 1a through 6a, 6a which normally bear against the outer surface of hood 34, as seen in FIG. 1. As shown in detail in FIG. 3, the clamping bolt assembly comprises an elongated rod which is generally circular in cross section and is provided with threaded end portions 70 and 72 of reduced diameter. The intermediate portion 74 of the rod is provided with a flat 76 extending over the entire length thereof and with a pair of longitudinally spaced flats 78 and 80 parallel to and diametrically displaced from flat 76. One end of the intermediate portion 74 of the bolt is provided with a pair of opposed flats 82 and 84 which intersect with flat 76 at right angles as shown in FIG. 4. Referring to FIGS. 1 and 6, it will be understood that when the bolts are assembled with end plates 36 and 38, flats 76, 82 and 84 interfittingly engage the walls of spaced slots 86 which open radially from the periphery of end plate 38, thereby preventing rotation of the bolts relative to end plates 36 and 38.

Threaded openings 88 and 90 located centrally of flats 78 and 80 respectively receive the threaded adjusting screws 1a, 1a through 6a, 6a, and locking nuts 1b, 1b through 6b, 6b are adapted to threadedly engage the adjusting screws and to be drawn down against flats 78 and 80, as seen in FIG. 1, to prevent unintentional withdrawal of the set screws from abutment with the hood 34. The shouldered nuts 1c, 1c through 6c, 6c are adapted to threadedly engage end portions 70 and 72 of the bolts 1 through 6 and interfit within circular recess 92 and 94 (FIG. 1) which respectively open from the spaced slots 86 in end plate 38 and the spaced circular openings 96 in end plate 36.

In making the adjustment of the center of rotation, the meter body 30 is operated preferably on a high heating value gas where the effect on the chart recording of heating value due to variations in delivery is more pronounced and can more easily be related to the angular position of the gas meter. From the chart record, empirical rules may be established by tests to determine the direction of shift and the required amount of shift in center of rotation of the meter body 30.

Assume that the empirically derived rules indicate that the center of rotation of meter body 30 should be shifted toward clamping bolt 1 by one turn of the adjusting screws 1a, 1a. First the locking nuts 1b, 1b, 2b, 2b and 6b, 6b are loosened sufficiently to permit rotation of their associated adjusting screws. Then adjusting screws 1a, 1a are backed off one full turn. The adjusting screws 2a, 2a and 6a, 6a, due to their 60 degree angular displacement from screws 1a, 1a, are backed off approximately one-half turn each, and then the loosened locking nuts are tightened down to lock the screws in their adjusted position. Each of the clamping bolts 1 through 6 is then loosened enough to permit shifting of the body 30 within the end plates 36 and 38. Then the adjusting screws opposite screws 1a, 1a, 2a, 2a and 6a, 6a, that is, screws 4a, 4a, 5a, 5a and 3a, 3a, are unlocked. Screws 4a, 4a are turned in one full turn while screws 2a, 2a and 6a, 6a are turned in until they engage the hood 34 or approximately one-half turn. These screws are then locked in their adjusted position. Finally, the clamping bolts are tightened down to prevent further shifting of the body 30 within the end plates 36 and 38.

The result achieved by the aforedescribed adjustment is that of shifting the meter body 30 upwardly relative to the level of the liquid sealing surface thereby increasing the volumetric capacity of the passage 51a which due to its indicated angular position is in open communication with the fluid inlet chamber 20. This results in an additional increment in the amount of fluid which is subsequently conveyed to the outlet chamber 22 and outlet tube 14. Furthermore, this increment in deliverable fluid is related to meter position in such a manner as to substantially neutralize any variation in delivery of fluid from passage 51a due to irregularities in the formation of structural elements defining the passage or due to eccentricity in the rotation of the end plates 36 and 38 about their common horizontal axis.

It will be understood that shifts in other directions and magnitudes dictated by the weave in chart record can be made in a similar manner by backing out selected adjusting screws, releasing clamping bolts and forcing in opposing adjusting screws. During the shift, the relative angular position of the meter body 30 and end bells 36 and 38 is retained and the shift in center of rotation of the body 30 results in substantially neutralizing the variation in delivery characteristic of the meter 10.

It may also be noted that by retaining the relative angular position of body 10 and end plates 36 and 38 and the selected adjusting screw positions, the meter body may be removed for cleaning and reassembled without disturbing the adjusted center of rotation of the body.

We claim:

1. In a fluid metering device comprising a fluid inlet, a fluid outlet and liquid displacement means for delivering a fluid between said inlet and outlet, the combination with a pair of end plates rotatable about a given axis, a meter body, of means compressively securing said meter body between said end plates including a plurality of like members penetrating said end plates at equally spaced rotary angles about the periphery of said meter body, and like adjusting devices carried by each of said members which bear against the outer periphery of said meter body and which may be individually adjusted in varying amounts to shift the axis of rotation of said meter body in relation to said given axis and thereby alter the delivery characteristics of said fluid metering device.

2. The combination according to claim 1 wherein said members are bolts non-rotatable in said end plates and have nuts taking onto the opposite threaded ends thereof, and wherein said adjusting devices are screws having penetrating threaded engagement with their respective bolts transversely of the longitudinal axis thereof.

3. The combination according to claim 2 wherein said screws have lock nuts to secure the same in adjusted position.

4. The combination according to claim 2 wherein each bolt has two adjusting screws mounted therein which are spaced equidistant from the transverse center line of said meter body.

References Cited in the file of this patent
UNITED STATES PATENTS
1,447,437    Schmidt _____ Mar. 6, 1923